(12) United States Patent
Jacobs et al.

(10) Patent No.: US 10,013,264 B2
(45) Date of Patent: *Jul. 3, 2018

(54) AFFINITY OF VIRTUAL PROCESSOR DISPATCHING

(71) Applicant: International Business Machines Corporation, Armonk, NY (US)

(72) Inventors: Stuart Z. Jacobs, Lakeville, MN (US); David A. Larson, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/848,993

(22) Filed: Sep. 9, 2015

(65) Prior Publication Data

US 2015/0378755 A1 Dec. 31, 2015

Related U.S. Application Data

(63) Continuation of application No. 13/803,990, filed on Mar. 14, 2013, now Pat. No. 9,183,017.

(Continued)

(51) Int. Cl.
*G06F 9/46* (2006.01)
*G06F 9/455* (2018.01)
(Continued)

(52) U.S. Cl.
CPC .......... *G06F 9/455* (2013.01); *G06F 9/45558* (2013.01); *G06F 9/4881* (2013.01);
(Continued)

(58) Field of Classification Search
CPC .......... G06F 2009/4557; G06F 9/4881; G06F 9/5007; G06F 9/5088
See application file for complete search history.

(56) References Cited

U.S. PATENT DOCUMENTS 8,166,254 B2 4/2012 Larson et al.
8,245,230 B2 * 8/2012 Danko .................. G06F 9/4881
718/102

(Continued)

FOREIGN PATENT DOCUMENTS

CN 101727351 A 6/2010

OTHER PUBLICATIONS

Micro-Partitioning Technology, http://pic.dhe.ibm.com/infocenter/powersys/v3r1m5/index.jsp?topic=/arecu/iphb1microlpar.htm, Mar. 6, 2013, pp. 1-2.

*Primary Examiner* — Lewis A Bullock, Jr.
*Assistant Examiner* — Kevin X Lu
(74) *Attorney, Agent, or Firm* — Roy W. Truelson

(57) ABSTRACT

In an embodiment, a request is received for a first partition to execute on a first virtual processor. If the first physical processor is available at a first node, the first virtual processor is dispatched to execute at the first physical processor at the first node that is the home node of the first virtual processor. If the first physical processor is not available, a determination is made whether the first physical processor is assigned to a second virtual processor and a home node of the second virtual processor is not the first node. If the first physical processor is assigned to a second virtual processor and the home node of the second virtual processor is not the first node, execution of the second virtual processor is stopped on the first physical processor and the first virtual processor is dispatched to the first physical processor.

13 Claims, 4 Drawing Sheets

Related U.S. Application Data

(60) Provisional application No. 61/715,944, filed on Oct. 19, 2012.

(51) Int. Cl.
  *G06F 9/48* (2006.01)
  *G06F 9/50* (2006.01)

(52) U.S. Cl.
  CPC .......... *G06F 9/5077* (2013.01); *G06F 9/5088* (2013.01); *G06F 2009/4557* (2013.01); *G06F 2009/45583* (2013.01)

(56) References Cited

U.S. PATENT DOCUMENTS

| | | |
|---|---|---|
| 2003/0088608 A1 | 5/2003 | McDonald |
| 2003/0115118 A1* | 6/2003 | Reinemann ............ G06Q 10/06 705/30 |
| 2004/0054999 A1 | 3/2004 | Willen et al. |
| 2008/0163203 A1 | 7/2008 | Anand et al. |
| 2008/0196031 A1 | 8/2008 | Danko |
| 2010/0223622 A1* | 9/2010 | Anand .................. G06F 9/5077 718/105 |
| 2011/0145505 A1 | 6/2011 | Anand et al. |
| 2011/0307903 A1* | 12/2011 | Vaddagiri ............. G06F 9/5088 718/105 |
| 2012/0066688 A1 | 3/2012 | Chiang et al. |
| 2013/0346693 A1 | 12/2013 | Zhang |
| 2014/0068605 A1 | 3/2014 | Tsirkin et al. |
| 2014/0115593 A1 | 4/2014 | Jacobs et al. |
| 2014/0245295 A1 | 8/2014 | Tsirkin et al. |

* cited by examiner

AFFINITY OF VIRTUAL PROCESSOR DISPATCHING

CROSS-REFERENCE TO RELATED APPLICATIONS

This application is a continuation of U.S. patent application Ser. No. 13/803,990, filed Mar. 14, 2013, entitled "IMPROVING AFFINITY OF VIRTUAL PROCESSOR DISPATCHING," now issued as U.S. Pat. No. 9,183,017, which claims the benefit of U.S. Provisional Application Ser. No. 61/715,944, filed Oct. 19, 2012, entitled "IMPROVING AFFINITY OF VIRTUAL PROCESSOR DISPATCHING," both of which are incorporated by reference herein in their entirety.

FIELD

An embodiment of the invention generally relates to computer systems and more particularly to computer systems that dispatch virtual processors to physical processors.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple smaller processor cores can be placed on a single chip, which is beneficial because a single, simple processor core is less complex to design and verify. This results in a less costly and complex verification process, as a once verified module, the processor, is repeated multiple times on a chip.

A technique known as multiple logical partitions take advantage of multi-processors. A logically partitioned computer comprises multiple logical partitions that implement virtual computers, which execute in separate memory spaces, may execute separate operating systems, and may use shared resources. Examples of shared resources are processors, memory, co-processors, network bandwidth, or secondary storage. One technique for allocating processors to partitions is to use virtual processors, which are representations of physical processor cores to the operating system of a logical partition that uses shared processors.

SUMMARY

A computer-readable storage medium and computer are provided. In an embodiment, a request is received for a first partition to execute on a first virtual processor. A determination is made whether a first physical processor is available at a first node, wherein the first node is a home node of the first virtual processor. If the first physical processor is available at the first node, the first virtual processor is dispatched to the first physical processor at the first node that is the home node of the first virtual processor, wherein the dispatching the first virtual processor to the physical processor at the first node further comprises executing the request on the first physical processor at the first node. If the first physical processor is not available at the first node, a determination is made whether the first physical processor at the first node is assigned to a second virtual processor and a home node of the second virtual processor is not the first node. If the first physical processor at the first node is assigned to a second virtual processor and the home node of the second virtual processor is not the first node, execution of the second virtual processor is stopped on the first physical processor at the first node and the first virtual processor is dispatched to the first physical processor at the first node.

Figure 1:
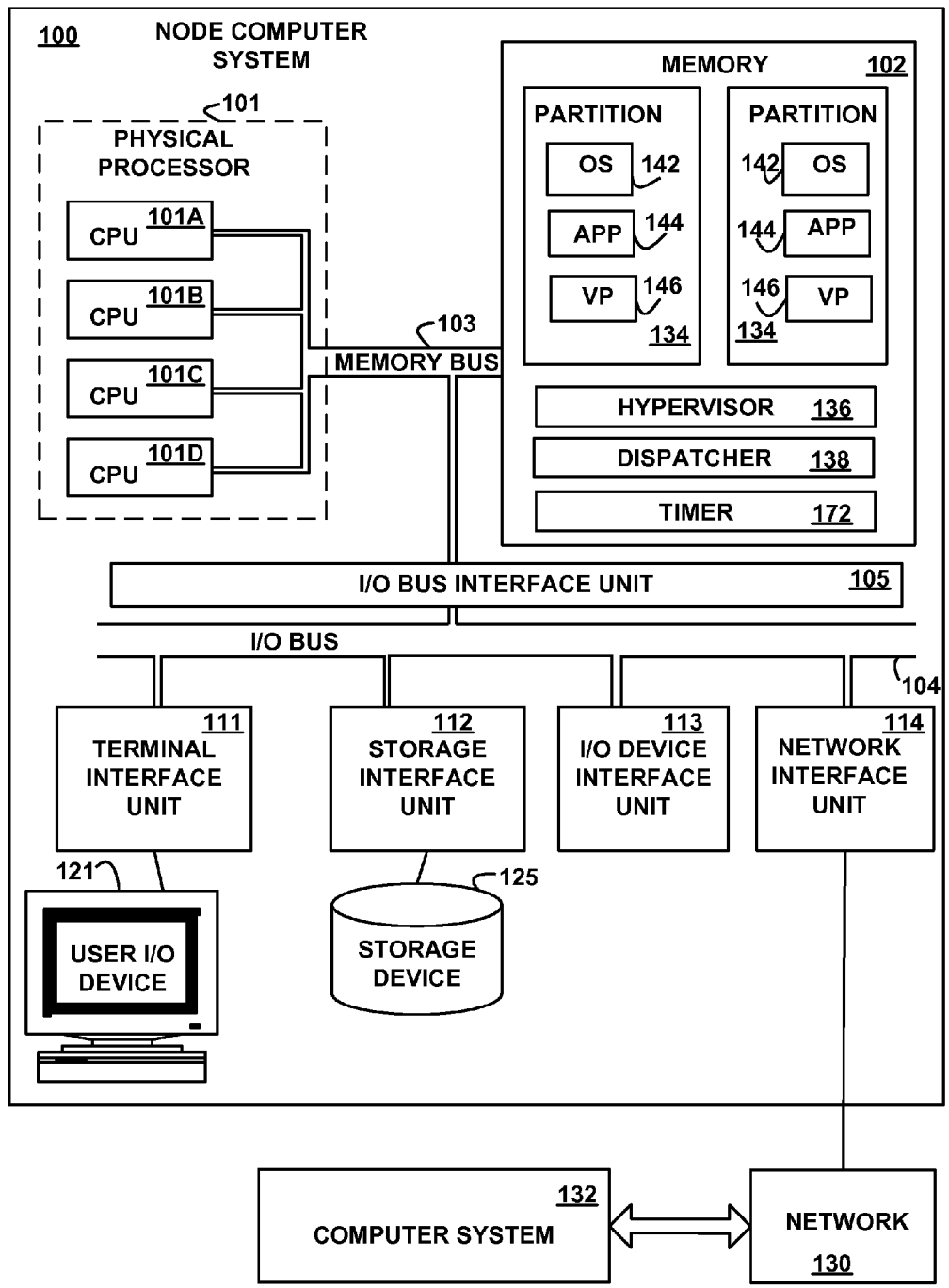
FIG. 1 depicts a high-level block diagram of an example system for implementing an embodiment of the invention.

It is to be noted, however, that the appended drawings illustrate only example embodiments of the invention, and are therefore not considered a limitation of the scope of other embodiments of the invention.

DETAILED DESCRIPTION

In an embodiment, to meet processor entitlement requirements of partitions, a dispatcher does not allow a physical processor core to remain idle if a partition has an entitled work request pending. Instead, the dispatcher may dispatch a virtual processor to a physical processor core that is not at the home node of the virtual processor.

An embodiment of the invention prioritizes work requests based on physical processor core and memory affinity. The dispatcher assigns each partition a respective entitled capacity, which is the quantity of physical processor cycles that the dispatcher guarantees the respective partition to receive without waiting. If configured to have the capability to consume beyond its entitlement, the partition may also consume additional or excess processor cycles of some node if excess (available) physical processor capacity exists at some node in the system of nodes. When a partition is receiving entitled processor capacity cycles, the dispatcher gives that partition's affinity a higher level of importance compared to other virtual machines that are using excess physical processor capacity if the dispatcher calculates that improved performance will result. The partition is not guaranteed to receive the excess physical processor cycles and may need to wait for the excess physical processor cycles or may not receive the excess physical processor cycles simultaneously with the entitled capacity of physical processor cycles. In various embodiments, the dispatcher receives the entitled capacities of the various partitions from a designer of the dispatcher, assigns each partition to have an equal entitled capacity where the sum of all the entitled capacities is the total processing capacity of the system of nodes, assigns each partition an entitled processor capacity in proportion to the partition's use of processing cycles during a historical time period, or assigns the entitled capacities that maximum the total performance of the system of nodes.

The dispatcher divides the system into multiple nodes or affinity domains representing groups of physical processor cores that provide acceptable performance if the processor core and the memory that the physical processor core accesses are within the same affinity domain, and less desirable performance if the physical processor core and the memory the processor core accesses are in different nodes or domains. Additionally, the dispatcher assigns the virtual processors of a partition to a home affinity node or domain, representing the node or domain that comprise the majority of the memory that the dispatcher expects the virtual processor to access. In an embodiment, the dispatcher assigns the home node to a virtual processor that the virtual processor (or the partition assigned to the virtual processor) has accessed (read from or written to the memory in that node) the most during an historical time period. In another embodiment, the dispatcher assigns, as the home node of a virtual processor, the node that comprises the memory that stores the partition that is assigned the virtual processor.

When making dispatching decisions, if a virtual processor is dispatched to a physical processor core outside of its home affinity domain (node), and the virtual processor is being dispatched to receive physical processor cycles from the excess physical processor capacity in the system, then the dispatcher records that virtual processor as consuming off home affinity domain (node) excess capacity. After the virtual processor has completed executing on that physical processor core, the dispatcher then removes the record kept of that virtual processor as consuming off home affinity domain (node) excess capacity.

When the dispatcher is deciding where to run a virtual processor for a partition that will be receiving entitled cycles and no available physical processor cores exist in the home affinity domain (node) of the virtual processor, the dispatcher determines if physical processor cores exist in the home affinity domain of the virtual processor that are running virtual processors consuming off home affinity domain excess capacity. If there are, then the dispatcher decides to run the virtual processor on one of those cores and ceases running the virtual processor that is receiving excess capacity on that core.

Thus, the dispatcher gives one set of virtual processors higher priority over another set of virtual processors when making affinity decisions, independent of any other prioritization between the partitions. In another embodiment, the dispatcher always gives a higher affinity priority to virtual processors receiving entitlement over virtual processors receiving excess capacity, without taking into account whether the excess capacity is being consumed in the home node of the virtual processor receiving it. In another embodiment, the dispatcher always gives a higher affinity priority to virtual processors receiving entitlement over virtual processors receiving entitlement on physical processors outside of their home affinity domain.

In addition to actively removing virtual processors receiving excess capacity off of their home affinity domain (node) in favor of allowing a virtual processor of a partition to receive entitled cycles in its home affinity domain, the dispatcher takes additional steps to return virtual processors back to their home affinity domain as quickly as possible in the event no choice exists but to run them outside of their home affinity domain (node).

When a virtual processor is dispatched to a physical processor outside of the home affinity domain (node) of the virtual processor, for the partition of the virtual processor receiving either entitled or excess capacity, the dispatcher periodically interrupts the execution of the virtual processor and monitors if conditions have changed such that an idle physical processor is now available at the home affinity domain (node) of the partition to which the virtual processor is assigned. In response to the dispatcher discovering an opportunity to return the virtual processor back to running at the home affinity domain (node) of the partition to which the virtual processor is assigned, the dispatcher moves the virtual processor to the idle physical processor core in the home affinity domain (node) of the virtual processor's partition, rather than waiting for the ordinary preemption and re-dispatch of the virtual processor to occur.

Referring to the Drawings, wherein like numbers denote like parts throughout the several views, FIG. 1 depicts a high-level block diagram representation of a node computer system 100 connected to another computer system 132 via a network 130, according to an embodiment of the present invention. The mechanisms and apparatus of embodiments of the present invention apply equally to any appropriate computing system.

The major components of the node computer system 100 comprise one or more physical processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The node computer system 100 contains one or more general-purpose programmable central processing units (CPUs) 101A, 101B, 101C, and 101D (also known as physical processor cores), herein generically referred to as the physical processor 101. In an embodiment, the node computer system 100 contains multiple physical processors typical of a relatively large system; however, in another embodiment the node computer system 100 may alternatively be a single CPU system. Each physical processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the node computer system 100, and may also include the virtual memory of other computer systems coupled to the node computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary components utilized in implementing a logically partitioned computing environment on the node computer system 100, including a plurality of logical partitions 134 managed by a partition manager or hypervisor 136 and a dispatcher 138. Although the partitions 134 and the hypervisor 136 are illustrated as being contained within the memory 102 in the node computer system 100, in other embodiments some or all of them may be on different computer systems, e.g., the computer system 132, and may be accessed remotely, e.g., via the network 130. Further, the node computer system 100 may use virtual addressing mechanisms that allow the programs of the node computer system 100 to behave as if they only have access to a large, single storage entity instead of access to multiple, smaller storage entities. Thus, while the partitions 134, the hypervisor 136, and the dispatcher 138 are illustrated as residing in the memory 102, these elements are not necessarily all completely contained in the same storage device at the same time. Although the hypervisor 136 and the dispatcher 138 are illustrated as being separate, in another embodiment, they may be packaged together.

Each of the logical partitions 134 comprises and utilizes an OS (operating system) 142, which controls the primary operations of the logical partition 134 in the same manner as the operating system of a non-partitioned computer. Some or all of the operating systems 142 may be the same or different from each other. Any number of logical partitions 134 may be supported, and the number of the logical partitions 134 resident at any time in the node computer system 100 may change dynamically as partitions are added or removed from the node computer system 100. The logical partitions 134 comprise virtual processors (VPs) 146, which represent the physical processors 101 (or portions, time slices, or multiples thereof) on the same or a different node.

Each of the logical partition 134 comprises instructions that execute on the processor 101 in a separate, or independent, memory space, and thus each logical partition 134 acts much the same as an independent, non-partitioned computer from the perspective of each application (app) 144 that executes in each such logical partition 134. As such, the applications 144 typically do not require any special configuration for use in a partitioned environment. In various embodiments, the application 144 is a user application, a third-party application, or any portion, multiple, or combination thereof. The application 144 comprises instructions that execute on the processor 101 or statements that are interpreted by instructions that execute on the processor 101. Each of the applications 144 may be the same or different from each other.

Given the nature of logical partitions 134 as separate virtual computers, it may be desirable to support interpartition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol. In another embodiment, the virtual network adapter may bridge to a physical adapter, such as the network interface unit 114. Other manners of supporting communication between partitions 134 may also be supported consistent with embodiments of the invention.

Although the hypervisor 136 and the dispatcher 138 are illustrated as being within the memory 102, in other embodiments, all or a portion of the hypervisor 136 and/or the dispatcher 138 may be implemented in firmware or hardware. The hypervisor 136 and/or the dispatcher 138 may perform both low-level partition management functions, such as page table management and may also perform higher-level partition management functions, such as creating and deleting the partitions 134, concurrent I/O maintenance, and allocating/deallocating processors, memory and other hardware or program resources to/from the various partitions 134. The hypervisor 136 and/or the dispatcher 138 control the allocation of the shared resources to the partitions 134 and the access of the shared resources by the partitions 134, ensuring security and isolation of these partitions 134 within the node computer system 100. The hypervisor 136 and/or the dispatcher 138 present the shared resources to the partitions 134 as standalone resources, so that the partitions 134 believes that they are the sole owner of the resource. In an embodiment, a shared resource has a limited capacity to perform the operations of which it is requested. For example, a coprocessor only has a limited queue depth for performing operations.

The hypervisor 136 and/or the dispatcher 138 statically and/or dynamically allocate to each logical partition 134 a portion of the available resources in the node computer system 100. For example, each logical partition 134 may be allocated one or more of the processors 101 and/or one or more hardware threads on which to execute, as well as a portion of the available memory space to access. The logical partitions 134 may share specific program and/or hardware resources such as the processors 101, such that a given resource may be utilized by more than one logical partition 134. In the alternative, program and hardware resources may be allocated to only one logical partition 134 at a time. Additional resources, e.g., mass storage, backup storage, user input, network connections, and the I/O adapters therefore, are typically allocated to one or more of the logical partitions 134. Resources may be allocated in a number of manners, e.g., on a bus-by-bus basis, or on a resource-by-resource basis, with multiple logical partitions 134 sharing resources on the same bus. Some resources may be allocated to multiple logical partitions 134 at a time. The resources identified herein are examples only, and any appropriate resource capable of being allocated may be used.

In an embodiment, the partitions 134, the hypervisor 136, and/or the dispatcher 138 comprise instructions that execute on the processor 101 or statements that are interpreted by instructions executing on the processor 101 to perform the functions as further described below with reference to FIGS. 2, 3, and 4. In another embodiment, the partitions 134, the hypervisor 136, and/or the dispatcher 138 may be implemented in microcode or firmware. In another embodiment, the hypervisor 136 and/or the dispatcher 138 may be implemented in hardware via logic gates, semiconductor devices, chips, circuits, circuit cards, and/or other physical hardware devices.

The memory 102 further comprises a timer 172. The timer 172 may be initialized to a specified starting value, threshold, or time period value, and count down to zero, at which time the timer 172 interrupts the dispatcher 138. In another embodiment, the timer 172 may be initialized to zero and count up to either a specified threshold or time period value or indefinitely until the timer 172 is reset. Regardless of whether the timer 172 counts up or down, the current value (the current count or time) of the timer 172 may be read by the dispatcher 138. Multiple instances of the timer 172 may time different events and may be referred to with different names. Although the timer 172 is illustrated as being a software timer included within the memory 102, in another embodiment, the timer 172 may be a hardware timer.

The memory bus 103 provides a data communication path or communications fabric for transferring data among the processor 101, the memory 102, and the I/O bus interface unit 105. Multiple nodes may be connected to the same memory bus 103 or communications fabric. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the node computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the node computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the node computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the node computer system 100 is a multi-user mainframe computer system, a single-user system, or a server computer or similar device that has little or no direct user interface, but receives requests from other computer systems (clients). In other embodiments, the node computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network or combination of networks and may support any appropriate protocol suitable for communication of data and/or code to/from the node computer system 100 and the computer system 132. In various embodiments, the network 130 may represent a storage device or a combination of storage devices, either connected directly or indirectly to the node computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable bus, combination of buses, network, combination of networks, or combination of networks and buses. Although one network 130 is shown, in other embodiments any number of networks (of the same or different types) may be present.

The computer system 132 may comprise some or all of the hardware and/or computer program elements of the node computer system 100.

FIG. 1 is intended to depict the representative major components of the node computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the node computer system 100 and that, when read and executed by one or more processors in the node computer system 100 or when interpreted by instructions that are executed by one or more processors, cause the node computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
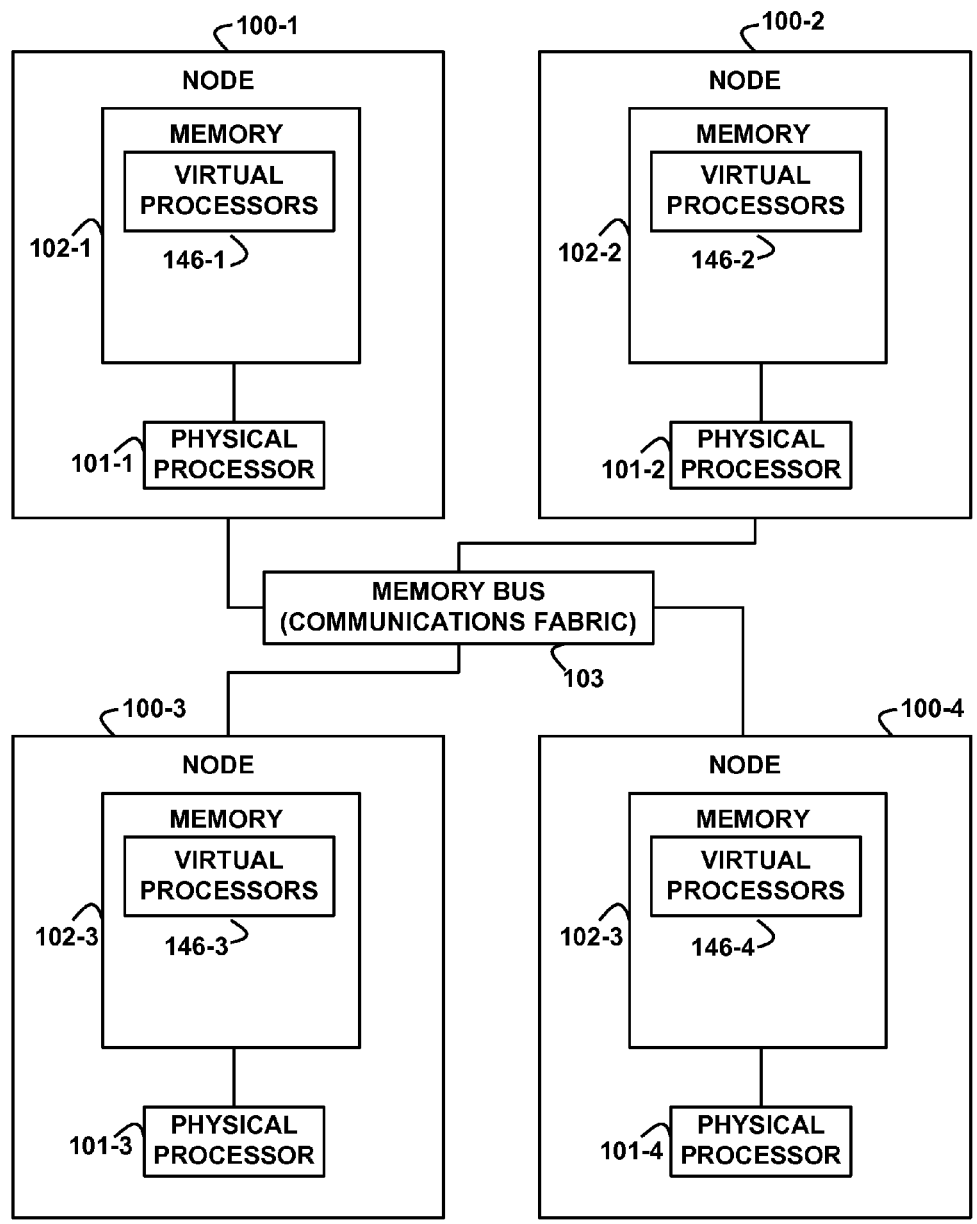
FIG. 2 depicts a high-level block diagram of a system of nodes, according to an embodiment of the invention.

FIG. 2 depicts a high-level block diagram of a system of nodes 100-1, 100-2, 100-3, and 100-4 connected via a memory bus or communications fabric 103, according to an embodiment of the invention. The nodes 100-1, 100-2, 100-3, and 100-4 are examples of, and are generically referred to by, the node computer system 100 (FIG. 1).

Referring again to FIG. 2, the node 100-1 comprises memory 102-1 connected to a physical processor 101-1; the node 100-2 comprises memory 102-2 connected to a physical processor 101-2; the node 100-3 comprises memory 102-3 connected to a physical processor 101-3; and the node 100-4 comprises memory 102-3 connected to a physical processor 101-4. The memory 102-1, 102-2, 102-3, and 102-4 are examples of, and are generically referred to by, the memory 102 (FIG. 1). Referring again to FIG. 2, the physical processors 101-1, 101-2, 101-3, and 101-4 are examples of, and are generically referred to by, processor 101 (FIG. 1). The memory 102-1 comprises virtual processors 146-1; the memory 102-2 comprises virtual processors 146-2; the memory 102-3 comprises virtual processors 146-3; and the memory 102-3 comprises virtual processors 146-4. The virtual processors 146-1, 146-2, 146-3, and 146-4 are examples of, and are generically referred to by, the virtual processors 146 (FIG. 1).

Referring again to FIG. 2, the dispatcher 138 may dispatch any of the virtual processors 146-1, 146-2, 146-3, and 146-4 to any of the physical processors 101-1, 101-2, 101-3, and 101-4. The dispatcher 138 assigns each virtual processor a home node (home affinity domain). In various embodiments, the dispatcher 138 may dispatch the virtual processor to a physical processor located at the home node of the virtual processor or to any other node. For example, in various embodiments, the dispatcher 138 may assign the virtual processor 146-1 a home node of the node 100-1, the node 100-2, the node 100-3, or the node 100-4.

Figure 3:
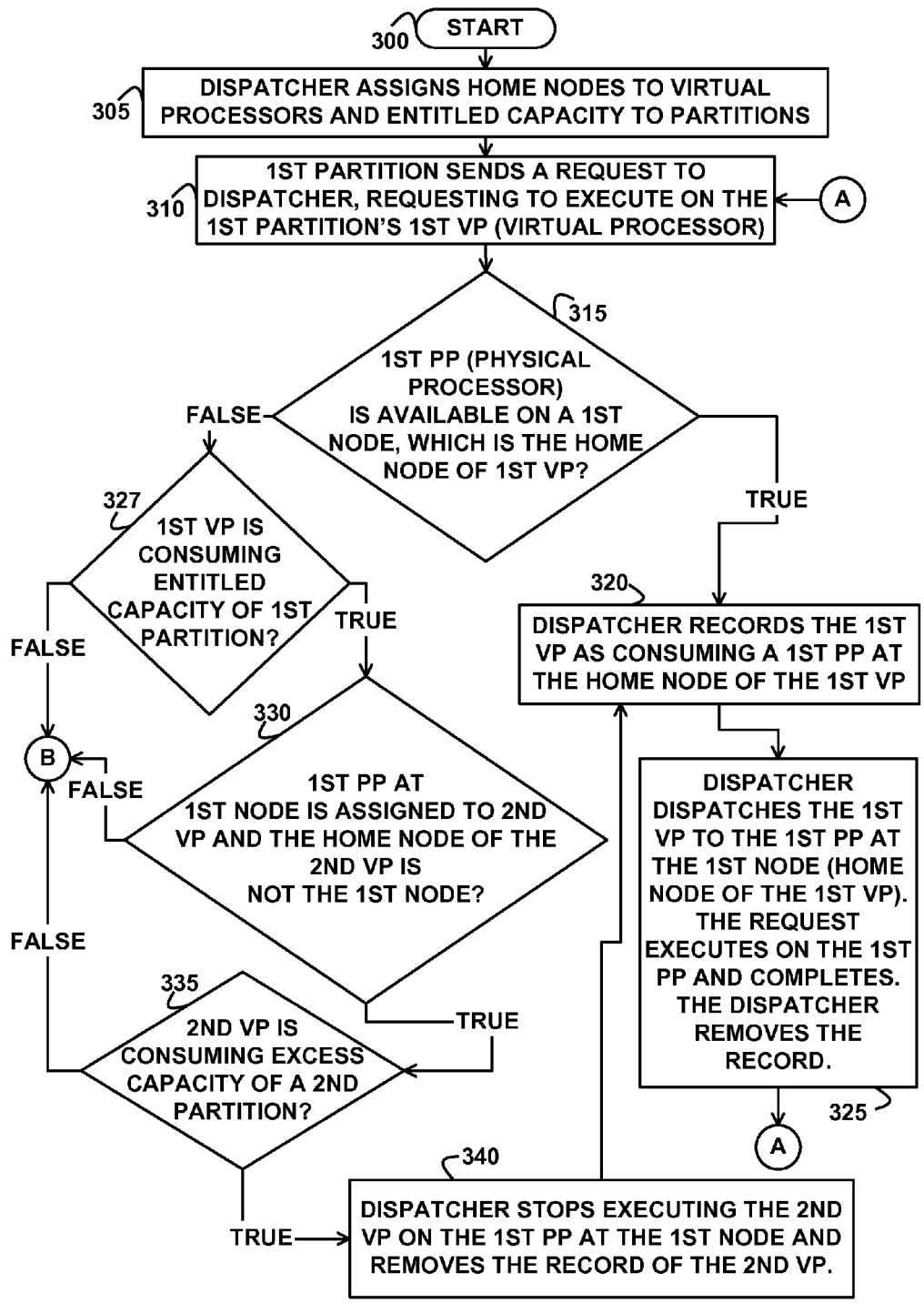
FIG. 3 depicts a flowchart of example processing for dispatching virtual processors, according to an embodiment of the invention.
Figure 4:
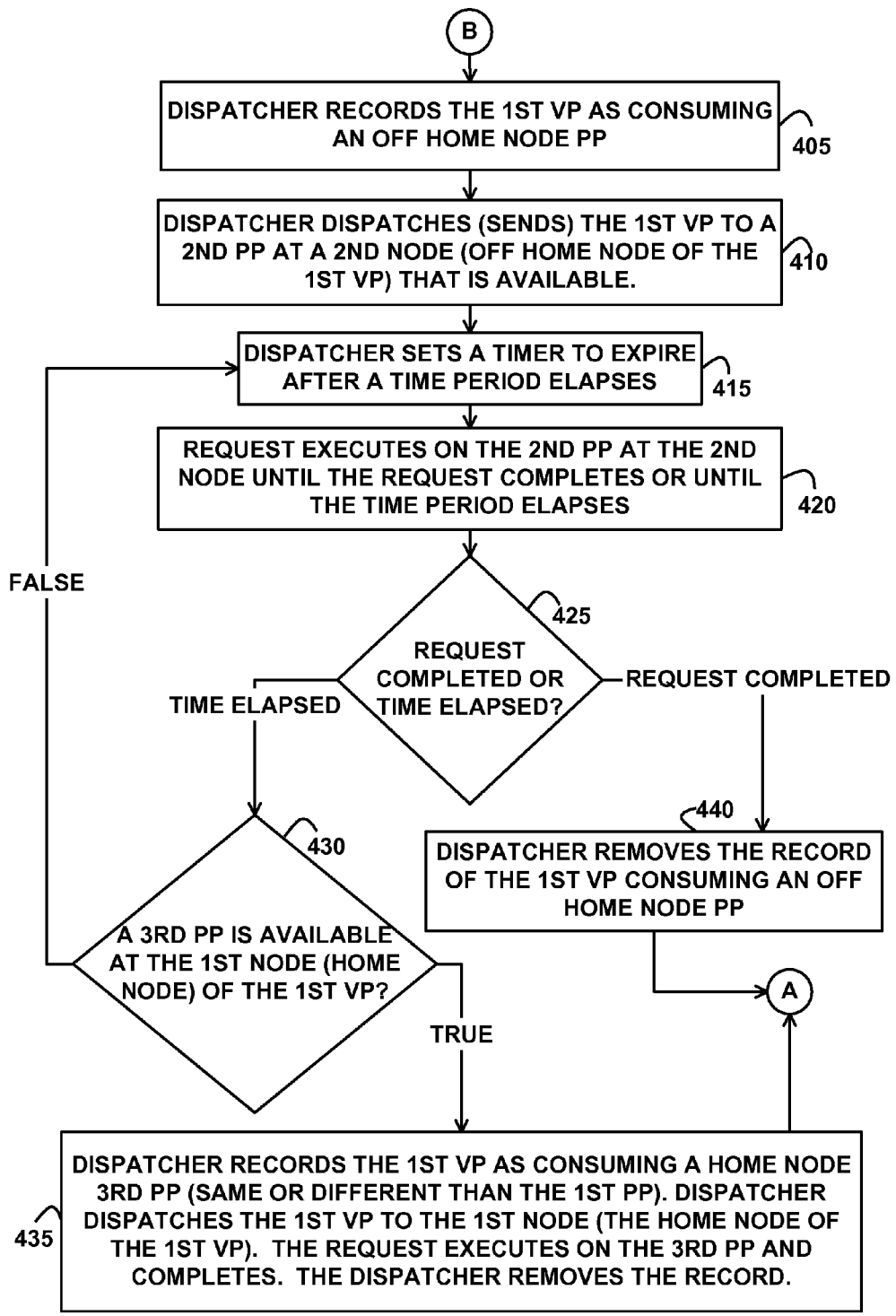
FIG. 4 depicts a flowchart of further example processing for dispatching virtual processors, according to an embodiment of the invention.

FIGS. 3 and 4 depict flowcharts of example processing for dispatching virtual processors, according to an embodiment of the invention. Control begins at block 300. Control then continues to block 305 where the dispatcher 138 assigns home nodes to virtual processors and assigns entitled capacity to partitions 134.

Control then continues to block 310 where a first partition 134 sends a request to the dispatcher 138, which requests to execute on the first virtual processor assigned to the first partition 134. In embodiment, the request is a request to execute a partition 134 or a portion of a partition 134, such as an application, a method, a function, a routine, a subroutine, a procedure, a sub-procedure, or a set of instructions or statements on a virtual processor.

Control then continues to block 315 where the dispatcher 138 determines whether a first physical processor is available (free, or not currently executing another request) on a first node, which is the home node of the first virtual processor. If the determination at block 315 is true, then a first physical processor is available (free, or not currently executing another request) on a first node, which is the home node of the first virtual processor, so control continues to block 320 where the dispatcher 138 records the first virtual processor as consuming (using) a first physical processor that is located at the home node of the first virtual processor. Control then continues to block 325 where the dispatcher 138 dispatches (sends) the request to the first node (the home node of the first virtual processor). The home node receives the request, and in response the request executes on the first physical processor. In response to execution of the request completing, the dispatcher 138 removes the stored record of the first virtual processor consuming a home node first physical processor. Control then returns to block 310 where the same or a different partition sends the same or a different request to the dispatcher 138, requesting to execute on a virtual processor assigned to that partition 134, as previously described above.

If the determination at block 315 is false, then the first physical processor at the first node (the home node of the first virtual processor) is not available because the first physical processor is busy executing a second virtual processor, so control continues to block 327 where the dispatcher 138 determines whether execution of the first virtual processor would consume entitled capacity of the partition 134 of the first virtual processor. That is, the dispatcher 138 determines whether the amount of processor cycles or time requested by the request to execute on the first virtual processor is less than or equal to the entitled capacity of the partition 134 of the first virtual processor. If the determination at block 327 is true, then execution of the first virtual processor (when assigned to a physical processor) consumes entitled capacity of the partition 134 of the first virtual processor, so control continues to block 330 where the dispatcher 138 determines whether the first physical processor at the first node (the home node of the first virtual processor) is assigned to a second virtual processor and the home node of the second virtual processor is not the first node (the home nodes of the first virtual processor and the second virtual processor are different nodes).

If the determination at block 330 is true, then the first physical processor at the first node (the home node of the first virtual processor) is assigned to a second virtual processor and the home node of the second virtual processor is not the first node, so control continues to block 335 where the dispatcher 138 determines whether the second virtual processor assigned to a second partition 134 is consuming excess capacity (not entitled capacity) of the second partition 134. That is, the dispatcher 138 determines whether the amount of processor cycles or time assigned to the second virtual processor is more than entitled physical processor capacity assigned to the second partition 134 of the second virtual processor.

If the determination at block 335 is true, then the second virtual processor assigned to a second partition 134 is consuming excess capacity (not entitled capacity) of the second partition 134, so control continues to block 340 where the dispatcher 138 stops executing the second virtual processor on the first physical processor at the first node and removes the record of the second virtual processor prior to completion of the execution of the request that the second virtual processor was executing. Control then continues to block 320, as previously described above.

If the determination at block 335 is false, then the second virtual processor assigned to a second partition 134 is consuming entitled capacity (not excess capacity) of the second partition 134 of the second virtual processor and the amount of physical processor cycles or processor time assigned to the second virtual processor is less than or equal to the entitled physical processor capacity assigned to the second partition 134 of the second virtual processor, so control continues to block 405 of FIG. 4, as further described below.

If the determination at block 330 is false, then the first physical processor at the first node (the home node of the first virtual processor) is assigned to a second virtual processor and the home node of the second virtual processor is the first node (the first virtual processor and the second virtual processor have the same home node), so control continues to block 405 of FIG. 4, as further described below.

If the determination at bock 327 is false, then execution of the request by the first virtual processor will consume excess processor capacity (dispatching the request and the first virtual processor will use more than the entitled processor capacity of the first partition 134 of the first virtual processor) and the amount of physical processor cycles or processor time requested by the request is more than the entitled processor capacity assigned to the first partition 134 of the first virtual processor, so control continues to block 405 of FIG. 4 where the dispatcher 138 records (saves a record to the memory 102) the first virtual processor as consuming (executing on) an off home node physical processor (a physical processor that is not at the home node of the first virtual processor). Control then continues to block 410 where the dispatcher 138 dispatches the first virtual processor to a second physical processor (which is available) at a second node, which is an off home node (not the home node) of the first virtual processor. That is, the dispatcher 138 starts executing the request on the first virtual processor, which represents (due to the dispatch) a time slice or number of processor cycles on the second physical processor. Control then continues to block 415 where the dispatcher 138 sets a timer 172 to expire after a time period elapses. Control then continues to block 420 where the request executes on the second physical processor at the second node until the request completes or until the time period of the timer 172 elapses, ends, or expires, whichever occurs first.

Control then continues to block 425 where the dispatcher 138 determines whether the request has completed or the time period that was set in the timer 172 has lapsed or ended. If the determination at block 425 determines that the request has completed, then control continues to block 440 where the dispatcher 138 removes (deletes) the record of the first virtual processor consuming an off home node (a non home node) physical processor. Control then returns to block 310 of FIG. 3 where the same or a different partition 134 sends the same or a different request to the dispatcher 138, requesting to execute on a virtual processor assigned to that partition 134, as previously described above.

If the determination at block 425 determines that the time period set in the timer 172 has lapsed or ended, then control continues to block 430 where the dispatcher 138 determines whether a third physical processor is available (not currently executing another request or not currently assigned another virtual processor) at the first node (the home node of the first virtual processor). If the determination at block 430 is true, then a third physical processor is available (not currently executing another request or not currently assigned another virtual processor) at the first node (the home node of the first virtual processor), so control continues to block 435 where the dispatcher 138 records the first virtual processor as consuming a third physical processor at the home node of the first virtual processor. In various embodiments, the third physical processor is the same or different physical processor as the first physical processor. The dispatcher 138 dispatches the first virtual processor to the first node, which is the home node of the first virtual processor. The request executes on the third physical processor and completes, which causes the dispatcher 138 to remove the record of the first virtual processor consuming a home node physical processor. Control then returns to block 310 of FIG. 3 where the same or a different partition 134 sends the same or a different request to the dispatcher 138, requesting to execute on a virtual processor assigned to that partition 134, as previously described above.

If the determination at block 430 is false, then a third physical processor is not available at the first node (the home node of the first virtual processor) because all physical processors at the first node are currently executing other requests or are assigned to other virtual processors, so control returns to block 415 where the dispatcher 138 sets the timer to expire after another time period elapses, as previously described above. In this way, the dispatcher 138 periodically monitors the status of physical processors at the home node of the first virtual processor and re-dispatches the first virtual processor to a physical processor at the home node of the first virtual processor, in response to a physical processor at the home node becoming available.

In this way, in an embodiment, the performance of virtual processors is improved.

The terms "first," second," and "third" are used herein for convenience of exposition and explanation only to identify different requests, partitions, and nodes. A request that operates as a first request in one embodiment may operate as a second or third request in another embodiment, and vice versa. Further, a partition 134 that operates as a first partition in an embodiment may operate as a second or third partition in another embodiment, and vice versa. Further, a node that operates as a first node in an embodiment, may operate as a second or third node in another embodiment, and vice versa. Further, a node that functions as a home node of one virtual processor may function as a non home node of that virtual processor or another virtual processor, and may function as the home node of another virtual processor, at the same time or at different times.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

receiving a request to execute on a first virtual processor for a first logical partition of a computer system, said computer system being partitioned into a plurality of logical partitions, each partition having a respective one or more virtual processors which are dispatched for execution to physical processors of said computer system, each virtual processor representing a respective processor to a respective operating system for the partition containing the respective virtual processor, said computer system having a plurality of nodes, each node having at least one physical processor and a respective portion of a memory of said computer system, each said physical processor executing instructions stored in said memory, wherein memory accesses from a physical processor to data in a portion of memory in the same node as the physical processor provide better performance than memory accesses from the physical processor to data in a portion of memory in a node other than the node containing the physical processor, wherein a first entitled processor capacity is assigned to the first logical partition, the first entitled processor capacity being a processor capacity that the first partition is entitled to receive;

determining whether a first physical processor is available at a first node, wherein the first node is a home node of the first virtual processor;

if the first physical processor is available at the first node, dispatching the first virtual processor to the first physical processor at the first node that is the home node of the first virtual processor, wherein the dispatching the first virtual processor to the physical processor at the first node further comprises executing the request on the first physical processor at the first node;

if the first physical processor is not available at the first node, determining whether the first virtual processor is consuming the first entitled processor capacity assigned to the first logical partition, and if so, whether the first physical processor at the first node is assigned to a second virtual processor and a home node of the second virtual processor is not the first node; and if the first virtual processor is consuming the first entitled processor capacity assigned to the first logical partition and the first physical processor at the first node is assigned to a second virtual processor and the home node of the second virtual processor is not the first node, stopping executing of the second virtual processor on the first physical processor at the first node and dispatching the first virtual processor to the first physical processor at the first node.

2. The method of claim 1, further comprising:
assigning the home node to the first virtual processor, wherein the assigning the home node to the first virtual processor further comprises selecting the home node from among a plurality of nodes.

3. The method of claim 1, further comprising:
if the first virtual processor is not consuming the first entitled processor capacity of the first partition, dispatching the first virtual processor to a second physical processor at a second node, wherein the second node is not the home node of the first virtual processor.

4. The method of claim 3, further comprising:
after a time period expires since the first virtual processor was dispatched to the second physical processor at the second node that is not the home node of the first virtual processor and the request has not completed executing, determining whether a third physical processor is available at the home node of the first virtual processor; and
if the third physical processor is available at the home node of the first virtual processor, dispatching the first virtual processor to the home node.

5. The method of claim 1, further comprising:
assigning a second entitled processor capacity to a second partition, wherein the assigning the second entitled processor capacity to the second partition further comprises assigning the second entitled processor capacity to the second partition that the second partition is guaranteed to receive, and wherein excess processor capacity of the second partition comprises excess processor capacity that the second partition is not guaranteed to receive.

6. A method of assigning workload in a computer system having a plurality of nodes, each node having at least one physical processor and a respective portion of a memory of said computer system, each said physical processor executing instructions stored in said memory, wherein memory accesses from a physical processor to data in a portion of memory in the same node as the physical processor provide better performance than memory accesses from the physical processor to data in a portion of memory in a node other than the node containing the physical processor, the method comprising:

allocating a respective one or more virtual processors to each logical partition of a plurality of logical partitions of said computer system, each logical partition having a respective operating system which dispatches tasks of the respective logical partition to the respective one or more virtual processors allocated to the respective logical partition, each virtual processor having a corresponding home node of said plurality of nodes;

allocating a respective entitled processing capacity to each of the plurality of logical partitions, the respective entitled processing capacity representing processing capacity that the respective logical partition is guaranteed to receive;

dispatching virtual processors to physical processors using a dispatcher which is shared among the plurality of logical partitions, the dispatcher dispatching each virtual processor to a corresponding physical processor by:

determining whether a physical processor is available in the home node of a respective virtual processor to be dispatched;

if a physical processor is available in the home node of the respective virtual processor to be dispatched, dispatching the respective virtual processor to a physical processor which is available in the home node of the respective virtual processor to be dispatched;

if no physical processor is available in the home node of the respective virtual processor to be dispatched, determining whether a currently executing virtual processor executing in a corresponding physical processor in the home node of the respective virtual processor can be halted to make the corresponding physical processor available to the respective virtual processor, wherein the dispatcher determines whether a currently executing virtual processor executing in a corresponding physical processor in the home node of the respective virtual processor can be halted to make the corresponding physical processor available to the respective virtual processor using whether the home node of the currently executing virtual processor is the node of the corresponding physical processor;

wherein determining whether a currently executing virtual processor executing in a corresponding physical processor in the home node of the respective virtual processor to be dispatched can be halted to make the corresponding physical processor available to the respective virtual processor further uses at least one of whether the logical partition to which the respective virtual processor to be dispatched is allocated is consuming entitled processing capacity and whether the logical partition to which the currently executing virtual processor is allocated is consuming entitled processor capacity.

7. The method of claim 6, further comprising:
if no physical processor is available in the home node of the respective virtual processor to be dispatched, and if the dispatcher determines that no currently executing virtual processor executing in a corresponding physical processor in the home node of the respective virtual processor can be halted to make the corresponding physical processor available to the respective virtual processor, then dispatching the respective virtual processor to a physical processor in a node which is not the home node of the respective virtual processor.

8. The method of claim 7, further comprising:
after a time period expires since the dispatching the respective virtual processor to a physical processor in a node which is not the home node of the respective virtual processor, again determining whether a physical processor is available in the home node of the respective virtual processor, and
if a physical processor is available in the home node of the respective virtual processor, dispatching the respective virtual processor to an available physical processor in the home node of the respective virtual processor.

9. A non-transitory computer-readable storage medium encoded with instructions, wherein the instructions when executed comprise:
receiving a request to execute on a first virtual processor for a first logical partition of a computer system, said computer system being partitioned into a plurality of logical partitions, each partition having a respective one or more virtual processors which are dispatched for execution to physical processors of said computer system, each virtual processor representing a respective processor to a respective operating system for the partition containing the respective virtual processor, said computer system having a plurality of nodes, each node having at least one physical processor and a respective portion of a memory of said computer system, each said physical processor executing instructions stored in said memory, wherein memory accesses from a physical processor to data in a portion of memory in the same node as the physical processor provide better performance than memory accesses from the physical processor to data in a portion of memory in a node other than the node containing the physical processor, wherein a first entitled processor capacity is assigned to the first logical partition, the first entitled processor capacity being a processor capacity that the first partition is entitled to receive;
determining whether a first physical processor is available at a first node, wherein the first node is a home node of the first virtual processor;
if the first physical processor is available at the first node, dispatching the first virtual processor to the first physical processor at the first node that is the home node of the first virtual processor, wherein the dispatching the first virtual processor to the physical processor at the first node further comprises executing the request on the first physical processor at the first node;
if the first physical processor is not available at the first node, determining whether the first virtual processor is consuming the first entitled processor capacity assigned to the first logical partition, and if so, whether the first physical processor at the first node is assigned to a second virtual processor and a home node of the second virtual processor is not the first node; and
if the first virtual processor is consuming the first entitled processor capacity assigned to the first logical partition and the first physical processor at the first node is assigned to a second virtual processor and the home node of the second virtual processor is not the first node, stopping executing of the second virtual processor on the first physical processor at the first node and dispatching the first virtual processor to the first physical processor at the first node.

10. The non-transitory computer-readable storage medium of claim 9, wherein the instructions further comprise:
assigning the home node to the first virtual processor, wherein the assigning the home node to the first virtual processor further comprises selecting the home node from among a plurality of nodes.

11. The non-transitory computer-readable storage medium of claim 9, wherein the instructions further comprise:
if the first virtual processor is not consuming the first entitled processor capacity of the first partition, dispatching the first virtual processor to a second physical processor at a second node, wherein the second node is not the home node of the first virtual processor.

12. The non-transitory computer-readable storage medium of claim 11, wherein the instructions further comprise:
after a time period expires since the first virtual processor was dispatched to the second physical processor at the second node that is not the home node of the first virtual processor and the request has not completed executing, determining whether a third physical processor is available at the home node of the first virtual processor; and
if the third physical processor is available at the home node of the first virtual processor, dispatching the first virtual processor to the home node.

13. The non-transitory computer-readable storage medium of claim 9, wherein the instructions further comprise:
assigning a second entitled processor capacity to a second partition, wherein the assigning the second entitled processor capacity to the second partition further comprises assigning the second entitled processor capacity to the second partition that the second partition is guaranteed to receive, and wherein excess processor capacity of the second partition comprises excess processor capacity that the second partition is not guaranteed to receive.

* * * * *